US007353381B2

(12) United States Patent
Sheth et al.

(10) Patent No.: US 7,353,381 B2
(45) Date of Patent: Apr. 1, 2008

(54) SUPPLICANT AND AUTHENTICATOR INTERCOMMUNICATION MECHANISM INDEPENDENT OF UNDERLYING DATA LINK AND PHYSICAL LAYER PROTOCOLS

(75) Inventors: Sachin C. Sheth, Seattle, WA (US); Mohammad Shabbir Alam, Redmond, WA (US); Arun Ayyagari, Seattle, WA (US); Abhishek Abhishek, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 972 days.

(21) Appl. No.: 10/453,089

(22) Filed: Jun. 3, 2003

(65) Prior Publication Data

US 2005/0010755 A1    Jan. 13, 2005

(51) Int. Cl.
*H04L 9/00*    (2006.01)
(52) U.S. Cl. .......................... 713/151; 726/14; 726/15; 709/230; 709/232; 710/11
(58) Field of Classification Search ................ 713/155, 713/168, 151; 380/283; 726/10, 13–15; 370/235.1; 709/230, 232, 237, 224; 710/11
See application file for complete search history.

(56) References Cited

U.S. PATENT DOCUMENTS

| 6,070,243 | A  | 5/2000 | See et al. | 713/201 |
| 6,339,830 | B1 | 1/2002 | See et al. | 713/202 |
| 6,757,250 | B1* | 6/2004 | Fayad et al. | 370/235.1 |
| 2004/0010713 | A1* | 1/2004 | Vollbrecht et al. | 713/201 |

OTHER PUBLICATIONS

A Step Ahead In The Directory Authentication Framework Francisco Jordon, Manuel Medina, Juan Carlos Cruellas & Isabel Gallego Upper Layer Protocols, Architectures and Applications, M. Medina and N. Borenstein 1994 IFIP pp. 89-106.
Certificate Based PKI and B2B E-Commerce: Suitable Match or Not? Kok Ming Ang, Information Security Research Centre William J. Caeill, Information Security REsearch Centre pp. 20-34 Year of Publication: 2001.
Issue and Trends of Information Technology Management in Contemporary Organizations vol. 2, 2002 Information Resources Management Association, International Conference, Seattle, Washington May 19-22, 2002.

\* cited by examiner

*Primary Examiner*—T. B. Truong
(74) *Attorney, Agent, or Firm*—Workman Nydegger

(57) ABSTRACT

A supplicant on a first computing system authenticating the first computing system to an authenticator on a second computing system in a manner that is independent of the underlying data link and physical layer protocols. The first computing system establishes a data link layer connection with the second computing system using specific data link and physical layer protocols. The supplicant on the first computing system and the authenticator on the second computing system then receive an indication that the data link layer connection has been established. The supplicant determines that authentication is to occur with the authenticator, and vice versa. The supplicant (and the authenticator) then instructs that authentication is to occur in a manner that is independent of the underlying data link and physical layer protocols used to establish the connection.

28 Claims, 5 Drawing Sheets

SUPPLICANT AND AUTHENTICATOR INTERCOMMUNICATION MECHANISM INDEPENDENT OF UNDERLYING DATA LINK AND PHYSICAL LAYER PROTOCOLS

BACKGROUND OF THE INVENTION

1. The Field of the Invention

The present invention relates to network authentication technology. More specifically, the present invention relates to mechanisms in which one computing system (i.e., a supplicant) authenticates to another computing system (i.e., an authenticator) in a manner that is independent of the underlying data link and physical layer protocols used to communicate between the supplicant and the authenticator.

2. Background and Related Art

Never before have so many had access to so much information, and never before have so many had the ability to readily communicate as they do now. This new era of highly advanced communication and information access is largely enabled by the advancement and proliferation of computer networks throughout the globe. Any individual having access to an Internet-enabled computing system may communicate with (or access resources from) any one of millions of other similarly-enabled computing systems (and potentially also their associated users). While this is certainly advantageous when behavior is appropriate, there is also the unfortunate opportunity to cause harm.

In order to mitigate harm caused in such a network environment, access to more highly sensitive network resources are controlled so that only certain computing systems or users may access that network resource. In order to identify a computing system to thereby make intelligent decisions on whether or not to grant access, it is necessary to determine the true identity of the computing system requesting access. Proper identification is accomplished in a common network process called "authentication".

Different data link and physical layer protocols implement different methods for authentication. For example, IEEE 802.11, IEEE 802.15, IEEE 802.3 and GPRS are examples of data link and physical layer protocols that each have their own authentication mechanisms. IEEE 802.11 has several physical media variations and is used for conventional wireless Local Area Network (LAN) transport. IEEE 802.15 is a wireless data link and physical layer protocol based on BLUETOOTH standards. IEEE 802.3 is a LAN protocol that governs link layer connections on a wired physical media. GPRS is a wireless media protocol often used in wireless Wide Area Networks (WANs) such as cellular networks.

As each data link and physical media transport has its own authentication mechanism, different authentication modules are used depending on the data link and physical layer protocols used in the network. Accordingly, authentication mechanisms are strongly tied to the data link and physical layer protocols. What would be advantageous is an authentication engine that works across multiple data link and physical layer protocols.

BRIEF SUMMARY OF THE INVENTION

The foregoing problems with the prior state of the art are overcome by the principles of the present invention which are directed towards a supplicant on a first computing system authenticating the first computing system to an authenticator on a second computing system in a manner that is independent of the underlying data link and physical layer protocols.

The first and second computing systems first establish a physical connection using a data link and physical layer protocol. The supplicant on the first computing system and the authenticator on the second computing system then receive an indication that the link layer connection has been established. The supplicant and authenticator may appear above the link layer in the protocol stack. The supplicant and authenticator may be informed of the connection by these lower connection layers such as the data link layer.

The supplicant on the first computing system then determines that authentication is to occur with the authenticator on the second computing system. Meanwhile, the authenticator on the second computing system determines that authentication is to occur with the supplicant on the first computing system.

The supplicant of the first computing system then instructs that authentication is to occur with the authenticator by, for example, placing a function call to a lower layer in the protocol stack that abstracts the mechanics of the particular data link and physical layer protocols. Likewise, the authenticator of the second computing system instructs that authentication is to occur with the supplicant by, for example, placing a function call to a similar abstraction layer. Accordingly, the interface between the supplicant and the lower data link layer, and the interface between the authenticator and its corresponding lower data link layer may be conducted in a manner that is independent of the underlying data link and physical layer protocols used to establish the peer-to-peer data link connection.

In one embodiment, the supplicant and authenticator are both IEEE 802.1x compliant, while the data link and physical layer protocols, may be based on IEEE 802.11, 802.15, 802.3 or any other data link and physical layer protocols that may be used by an IEEE 802.1x supplicant and authenticator.

A single computing system may contain both an authenticator and a supplicant, and may contain multiple instances of a supplicant and/or authenticator. If each computing system in a network has an authenticator and a supplicant, and may instantiate multiple instances of the authenticator and supplicant, an authentication tree structure or other interconnected authentication network may be established. In an authentication tree, each node represents a computing system. The connection between nodes is represented by the authentication between a supplicant on one node and an authenticator on another node. Accordingly, a node may have multiple authentication branches to other nodes in the authentication tree.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
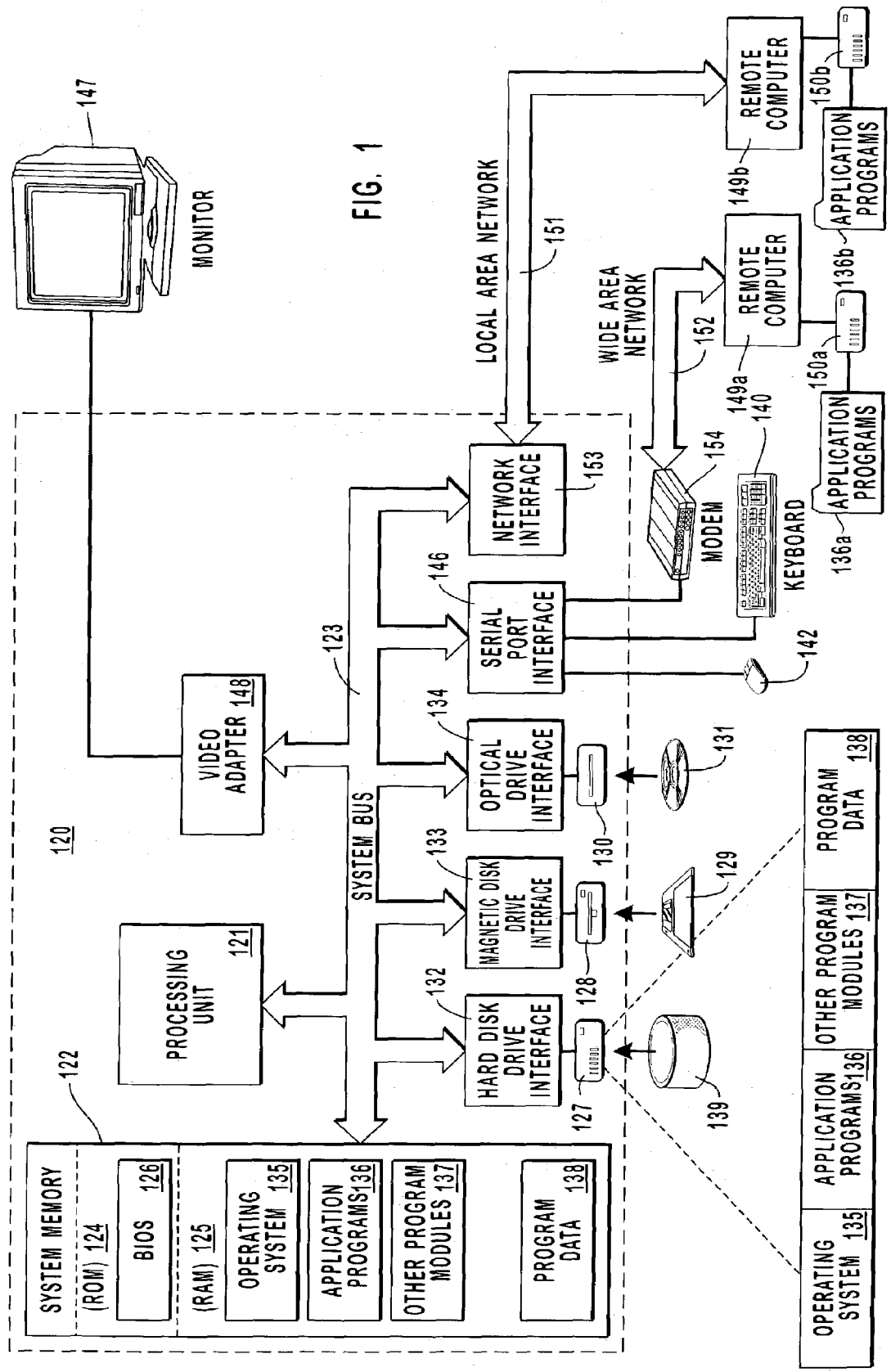
FIG. 1 illustrates a suitable computing system that may implement the features of the present invention.

The principles of the present invention relate to a supplicant on a first computing system authenticating the first computing system to an authenticator on a second computing system in a manner that is independent of the underlying data link and physical layer protocols. The first computing system establishes a link layer connection with the second computing system using data link and physical layer protocols. The supplicant on the first computing system and the authenticator on the second computing system then receive an indication that the link layer connection has been established. The supplicant then determines that authentication is to occur with the authenticator on the second computing system. Meanwhile, the authenticator determines that authentication is to occur with the supplicant on the first computing system. The supplicant then instructs that authentication is to occur with the authenticator in a manner that is independent of the underlying data link and physical layer protocols used to establish the connection. Likewise, the authenticator instructs that authentication is to occur with the authenticator in a manner that is independent of the underlying data link and physical layer protocols.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either wired, wireless, or a combination of wired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by wired links, wireless links, or by a combination of wired or wireless links) through a communications network. In a distributed computing environment, program modules may be located in both local and remote memory storage devices.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joystick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any of a wide variety of computing system may implement the features of the present invention with suitable software. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
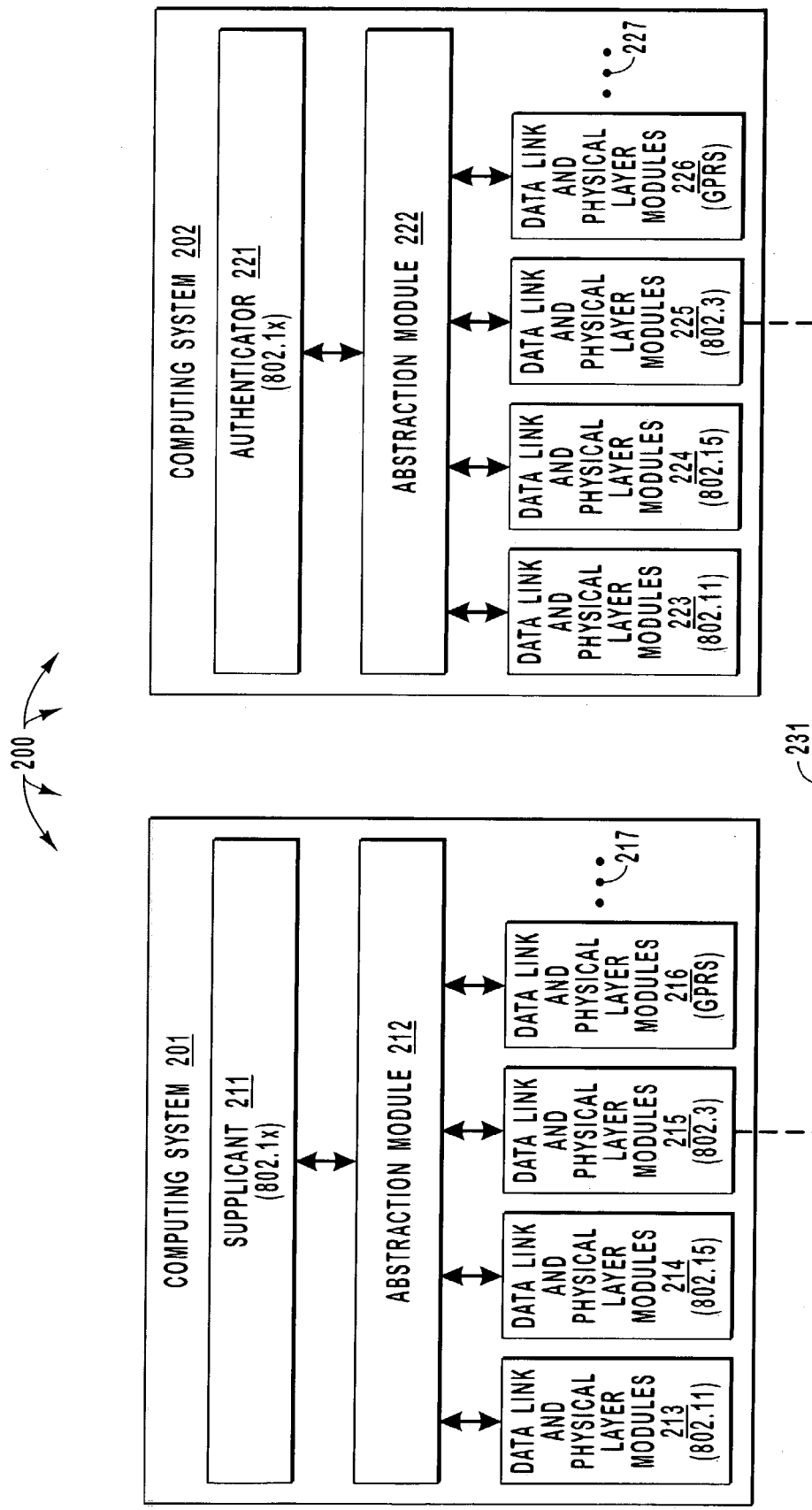
FIG. 2 illustrates a network environment in which the present invention may be employed.

FIG. 2 illustrates a network environment 200 in which the principles of the present invention may be employed. The network environment 200 includes a first computing system 201 that may communicate with a second computing system 202. The first computing system 201 runs a supplicant 211 that is configured to assist the first computing system 201 in authenticating with the second computing system 202. Accordingly, the first computing system 201 will also be referred to herein as "supplicating computing system" 201. The second computing system 202 runs an authenticator 221 that is configured to assist the second computing system 202 in authenticating the first computing system 201. Accordingly, the second computing system 202 will also be referred to herein as "authenticating computing system" 202.

The supplicating computing system 201 includes a number of data link and physical layer modules, at least one of which being configured to establish a link layer connection with the authenticating computing system 202 (and potentially other computing systems) using corresponding data link and physical layer protocol. The supplicating computing system 201 may include any number of data link/physical layer module combinations, even perhaps a single data link/physical layer module combination. However, in the illustrated embodiment, the supplicating computing system 201 includes data link and physical layer protocols 213, 214, 215 and 216 among potentially many more as represented by the horizontal ellipses 217. The data link and physical layer protocols not only establish the data link layer connection, but also authenticate with the authenticator 221 using the corresponding data link and physical layer protocols, and issue a notification when the data link layer connection is established.

The data link and physical layer modules 213 through 217 may implement any data link and physical layer protocols. However, for illustrative purposes, data link and physical layer modules 213 are based on IEEE 802.11 used commonly for wireless networks, data link and physical layer modules 214 are based on IEEE 802.15 often referred to as BLUETOOTH, data link and physical layer modules 215 are based on IEEE 802.3 used to implement the Ethernet, and data link and physical layer modules 216 are based on GPRS. However, there is no limit to the data link and physical layer protocols that may be implemented by the physical media modules 213 through 217.

The supplicant 211 is configured to instruct that authentication is to occur with the authenticator 221 once it is notified from a corresponding link layer module of one of the data link and physical layer modules 213 through 217 that a link layer connection is established. The instruction is provided in a manner that is independent of the underlying data link and physical layer protocols used to communicate with the authenticating computing system 202. An abstraction module 212 is configured to convert the instruction from the supplicant 211 into a form that may be interpreted by the data link and physical layer modules that created the link layer connection (in this case, data link and physical media modules 215). If the notification that is generated by the data link and physical media modules 215 is not directly interpretable by the supplicant 211, the abstraction module 212 may also serve to translate the notification.

The authenticating computing system 202 also includes a number of data link and physical layer modules, at least one of which being configured to establish a link layer connection with the supplicating computing system 201 (and potentially other computing systems) using corresponding data link and physical layer protocols. The authenticating computing system 202 may also include any number of (and even a single) data link/physical layer modules combination. However, in the illustrated embodiment, the authenticating computing system 202 includes data link/physical layer module combinations 223, 224, 225 and 226 among potentially many more as represented by the horizontal ellipses 227. The data link and physical layer modules not only establish the data link layer connection, but also authenticate with the authenticator 221 using the corresponding data link and physical layer protocols, and issue a notification when the data link layer connection is established.

The physical media modules 223 through 227 may implement any data link and physical layer protocols. However, for illustrative purposes, the data link and physical layer modules 222 through 226 are based on IEEE 802.11, IEEE 802.15, IEEE 802.3, and GPRS protocols, respectively. In the illustrated embodiment, the data link and physical layer modules 215 of the supplicating computing system 201 establish a data link layer connection 231 with like data link and physical layer modules 225 of the authenticating computing system 202. The data link and physical layer module 225 is like the data link and physical media modules 215 in that they are capable of implementing the same data link and physical layer protocols as the physical media module 215.

The authenticator 221 is configured to instruct that authentication is to occur with the supplicant 211 once the authenticator 221 is notified from one of the data link and physical media modules 213 through 217 that a link layer connection is established. The instruction is provided in a manner that is independent of the underlying data link and physical layer protocols used to communicate with the supplicating computing system 201. An abstraction module 222 is configured to convert the instruction from the authenticator 221 into a form that may be interpreted by the data link and physical media modules that created the physical connection (in this case, data link and physical layer modules 225). If the notification that is generated by the data link and physical layer modules 225 is not directly interpretable by the authenticator 221, the abstraction module 222 may also serve to translate the notification.

The supplicating computing system 201 and the authenticating computing system 202 may each take the form of any computing system. However, if the supplicating computing system 201 takes the form of computer 120 of FIG. 1, the supplicant 211, the abstraction module 212 and the data link and physical layer modules 213 through 217 may each be one of the application programs 136 or other program modules 137. Likewise, if the authenticating computing system 202 takes the form of computer 120 of FIG. 1, the authenticator 221, the abstraction module 222 and the data link and physical layer modules 223 through 227 may each be one of the application programs 136 or other program modules 137. In one embodiment, the supplicant 211 and authenticator 221 are IEEE 802.1x supplicants and authenticators, respectively.

Figure 3:
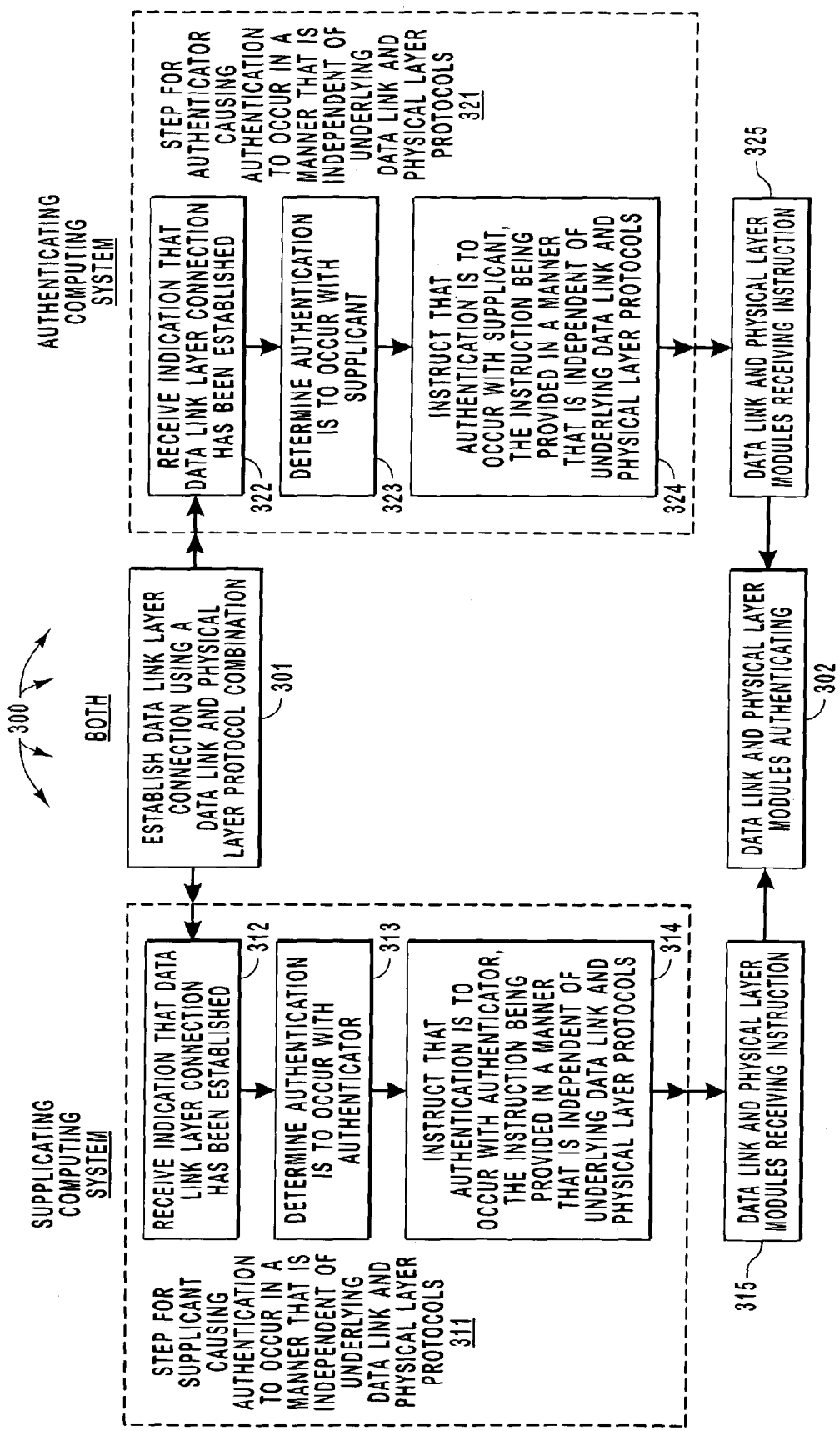
FIG. 3 illustrates a flowchart of a method for a supplicant and an authenticator interacting to perform authentication in a manner that is independent of the underlying data link and physical layer protocols used to establish the connection in accordance with the principles of the present invention.

FIG. 3 illustrates a flowchart of a method 300 for the supplicating computing system 201 communicating with the authenticating computing system 202 to accomplish authentication of the supplicating computing system 201 or its user in a manner that is independent of the underlying data link and physical layer protocols used to communicate between the supplicating and authenticating computing systems. The method 300 may be performed in the network environment 200 of FIG. 2 and thus is now described with frequent reference to FIG. 2.

Some of the acts and a step of the method 300 are performed by the supplicating computing system 201 as represented in the left column of FIG. 3 under the heading "SUPPLICATING COMPUTING SYSTEM". Other acts and a step of the method 300 are performed by the authenticating computing system 202 as represented in the right column of FIG. 3 under the heading "AUTHENTICATING COMPUTING SYSTEM". Other acts are performed cooperatively by both the supplicating and authentication computing systems as represented in the center column of FIG. 3 under the heading "BOTH". The supplicating and authenticating computing system cooperatively interact to establish a data link layer connection with each other using a data link and physical layer protocol combination (act 301). For example, referring to FIG. 2, the data link and physical layer modules 215 and the data link and physical layer modules 225 cooperatively interact to form connection 231.

The supplicating computing system 201 then performs a functional, result-oriented step for the supplicant 211 causing authentication to occur in a manner that is independent of the underlying data link and physical layer protocols (step 311). While this step may include any corresponding acts that accomplish this result, the illustrated step 311 includes corresponding acts 312 through 314 performed by the supplicant 211.

Likewise, the authenticating computing system 202 performs a function, result-oriented step for the authenticator 221 causing authentication to occur in a manner that is independent of the underlying data link and physical layer protocols. While this step may also include any corresponding acts that accomplish this result, the illustrated step 321 includes corresponding acts 322 through 324 performed by the authenticator 221.

Specifically, the supplicant 211 receives an indication that the data link layer connection 231 has been established (act 312). Likewise, the authenticator 221 also receives an indication that the data link layer connection 231 has been established (act 322). This indication may take the form of a notice from the corresponding data link and physical media module combination that established the data link layer connection.

The supplicant 211 then determines that authentication is to occur with the authenticator 221 (act 313) while the authenticator 221 determines that authentication is to occur with the supplicant 211 (act 323). This determination may be made in response to having received an instruction from an application program or user.

The supplicant 211 then instructs that authentication is to occur with the authenticator 221 (act 314). This instruction may be provided to the data link and physical layer modules (in this case, data link and physical layer modules 215) that established the connection. The instruction is provided via the abstraction module 212 so that the instruction may be the same regardless of which data link and physical layer module combinations 213 through 217 established the connection.

Likewise, the supplicant 221 then instructs that authentication is to occur with the supplicant 211 (act 324). This instruction may also be provided to the data link and physical layer modules (in this case, data link and physical layer modules 225) that established the connection via the abstraction module 222 so that the instruction may be the same regardless of which data link and physical layer module combination 223 through 227 established the connection.

The data link and physical layer module 215 on the supplicating computing system 201 receives at least a derivative of the supplicant instruction (act 315), while the data link and physical layer module 225 on the authenticating computing system 202 receives at least a derivative of the authenticating instruction (act 325). The data link and physical layer modules 315 and the data link and physical layer modules 325 then authenticate using the corresponding data link and physical layer protocols (act 302).

Accordingly, the principles of the present invention permit one computing system to authenticate to the other using a supplicant and an authenticator without the supplicant and authenticator needing to specifically interface with each possible data link and physical layer module combination that may be used establish the connection and authenticate. This model facilitates even more complex supplicant/authenticator networks.

Figure 4:
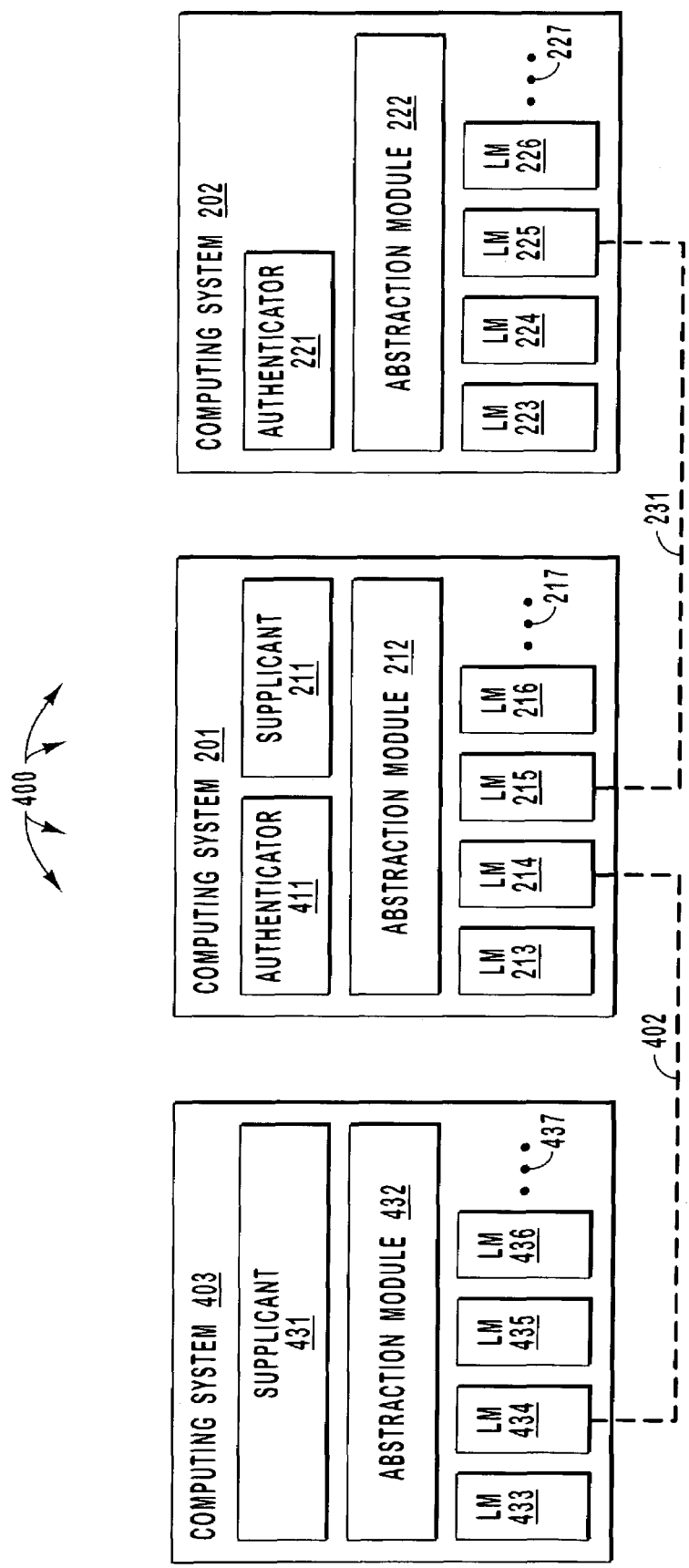
FIG. 4 illustrates a network environment in which a chain of authentication may be established by having an intermediary computing system use both a supplicant and an authenticator in accordance with the principles of the present invention.

FIG. 4 illustrates one such more complex network 400 which includes not only the first computing system 201 and the second computing system 202, but also includes a third computing system 403. The third computing system 403 includes a supplicant 431, an abstraction module 432, and lower layer modules 433 through 437, which may be similar to the respective elements 211 through 217 described above with respect to the first computing system 201. The first computing system 201 in this case also includes an authenticator 411 as well as the supplicant 211. The authenticator 411 may be similar to the authenticator 221 described above. The authenticator 411 may interface with the abstraction module 212 in the same manner as the authenticator 221 interfaces with the abstraction module 222.

Here, the computing system 403 supplicates to the computing system 201 via the connection 402 to thereby authenticate the computing system 403 to the computing system 201. This authentication may also occur independent of the data link and physical layer protocols used to communicate between the computing systems 403 and 201 in the same manner as the authentication occurs between the computing system 201 and 202. The data link and physical layer protocols communicating over connection 402 need not even be the same as the data link and physical layer protocols used to communicate over the connection 231.

Figure 5:
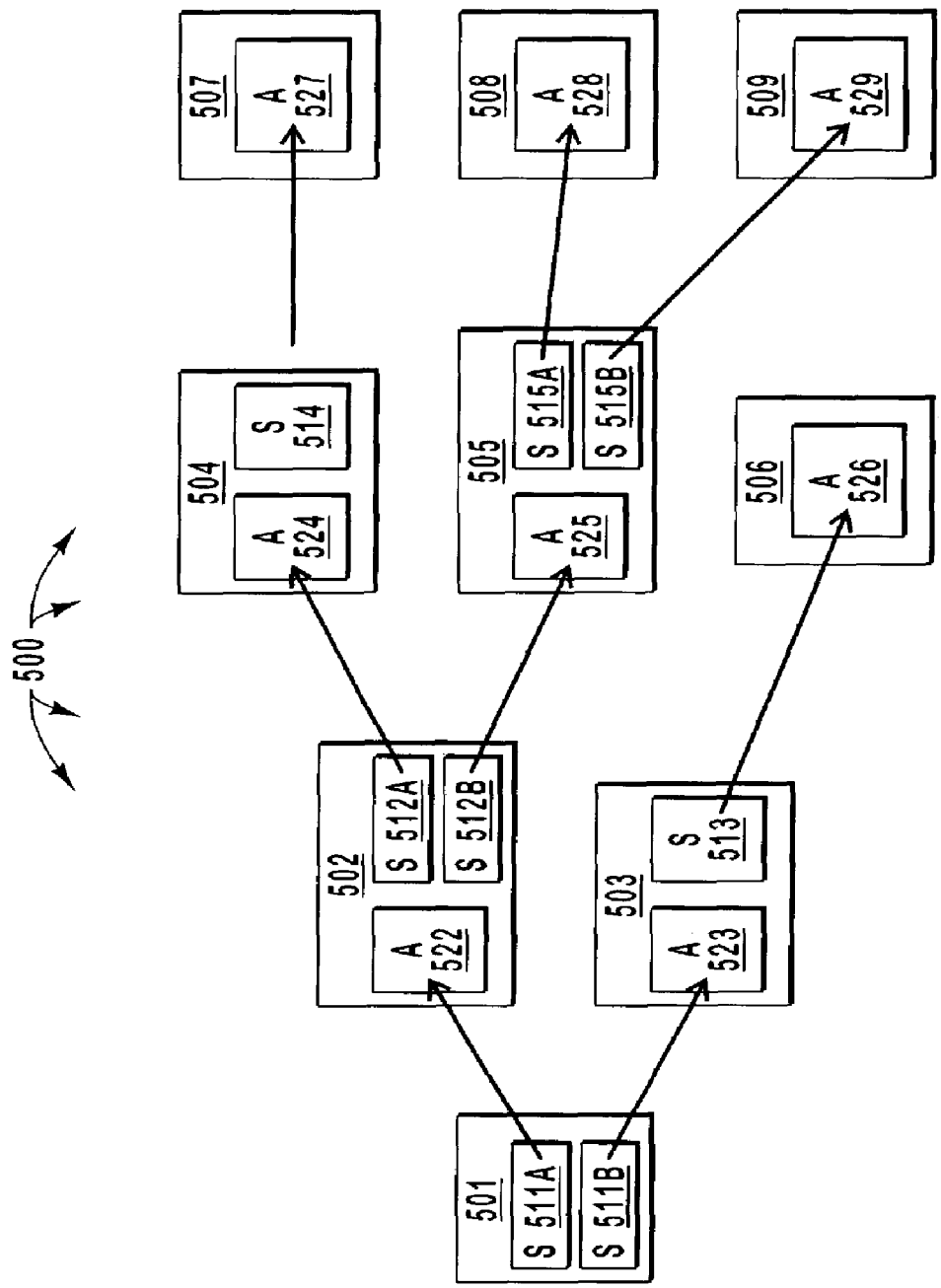
FIG. 5 illustrates a more complex authentication tree that is enabled by the features of the present invention.

FIG. 5 illustrates an even more complex network to demonstrate that the principles of the present invention may create an arbitrary network of supplicating and authenticating computing systems. The example network environment 500 includes computing systems 501 through 509. The direction of supplication begins at a computing system 501, which runs two supplicant instances 511A and 511B. The supplicant instance 511A authenticates to the authenticator instance 522 of the computing system 502. The supplicant instance 511B authenticates to the authenticator instance 523 of the computing system 503. The supplicant instance 512A of the computing system 502 authenticates to the C authenticator instance 524 of the computing system 504. The supplicant instance 512B of the computing system 502 authenticates to the authenticator instance 525 of the computing system 505. The supplicant instance 514 of the computing system 504 authenticates to the authenticator instance 527 of the computing system 507. The supplicant instance 515A of the computing system 505 authenticates to the authenticator instance 528 of the computing system 508. The supplicant instance 515B of the computing system 505 authenticates to the authenticator instance 529 of the computing system 509. The supplicant instance 513 of the computing system 503 authenticates to the authenticator instance 526 of the computing system 506.

Each of these authentications may occur independent of the underlying data link and physical layer protocols as described above with respect to FIG. 2. Accordingly, the supplication/authentication network 500 may be implemented across one or many different data link and physical layer protocols, thereby decoupling supplication and authentication from the data link and physical layer protocols, and thereby enabling more flexible supplication networks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment including a first computing system that executes a supplicant and a second computing system that executes an authenticator, a method for the supplicant communicating with the authenticator to accomplish authentication of the first computing system or its user in a manner that is independent of the underlying data link and physical layer protocols used to communicate between the first and second computing systems, the method comprising:
   an act of the first computing system establishing a data link layer connection with the second computing system using data link and physical layer protocols;
   an act of the supplicant receiving an indication that the data link layer connection has been established;
   an act of the supplicant determining that authentication is to occur with the authenticator;
   an act of the supplicant providing an instruction that authentication is to occur with the authenticator, the instruction being provided to an abstraction module and in a manner that is independent of the underlying data link and physical layer protocols used by data link and physical layer modules of the first computing system to communicate with the second computing system; and
   converting the instruction that is received from the supplicant at the abstraction module and into a form that is interpretable by the data link and physical layer modules of the first computing system.

2. A method in accordance with claim 1, further comprising the following:
   an act of the data link and physical layer modules that implement the data link and physical layer protocols receiving the converted instruction, comprising at least a derivative of the supplicant instruction; and
   an act of the data link and physical layer modules utilizing the data link and physical layer protocols to authenticate with the authenticator at the second computing system.

3. A method in accordance with claim 1, further comprising the following:
   an act of the supplicant receiving an authentication instruction, wherein the act of the supplicant determining that authentication is to occur with the authenticator occurs in response to the authentication instruction.

4. A method in accordance with claim 1, wherein the data link and physical layer protocols are wireless data link and physical layer protocols.

5. A method in accordance with claim 4, wherein the wireless data link and physical layer protocols are based on an IEEE 802.11 protocol.

6. A method in accordance with claim 4, wherein the wireless data link and physical layer protocols are based on an IEEE 802.15 protocol.

7. A method in accordance with claim 4, wherein the wireless data link and physical layer protocols are a GPRS protocol.

8. A method in accordance with claim 1, wherein the data link and physical layer protocols are based on an Ethernet protocol.

9. A method in accordance with claim 1, wherein the supplicant is an 802.1x supplicant.

10. A method in accordance with claim 1, wherein the authenticator is a first authenticator, the supplicant is a first supplicant, the data link connection is a first data link connection, and the data link and physical layer protocols are first data link and physical layer protocols, the first computing system further executing a second authenticator, the network environment further including a third computing system that executes a second supplicant, the first computing system further performing the following:
- an act of the first computing system facilitating establishment of a second data link layer connection with the third computing system using second data link and physical layer protocols;
- an act of the second authenticator receiving an indication that the second data link layer connection has been established;
- an act of the second authenticator determining that authentication is to occur with the second supplicant; and
- an act of the second authenticator instructing that authentication is to occur with the second supplicant, the instruction being provided in a manner that is independent of the underlying data link and physical layer protocols used to communicate with the third computing system.

11. A method in accordance with claim 10, wherein the first and second data link and physical layer protocols are the same.

12. A method in accordance with claim 10, wherein the first and second data link and physical layer protocols are different.

13. A computer program product for use in a network environment including a first computing system, and a second computing system that executes an authenticator, the computer program product comprising one or more computer-readable storage media having thereon computer-executable instructions that, when executed by one or more processors at the first computer system, cause the first computing system to implement a supplicant that communicates with the authenticator to accomplish authentication of the first computing system or its user in a manner that is independent of the underlying data link and physical layer protocols used to communicate between the first and second computing systems, and cause the following:
- an act of the first computing system establishing a data link layer connection with the second computing system using data link and physical layer protocols;
- an act of the supplicant receiving an indication that the data link layer connection has been established;
- an act of the supplicant determining that authentication is to occur with the authenticator;
- an act of the supplicant providing an instruction that authentication is to occur with the authenticator, the instruction being provided to an abstraction module and in a manner that is independent of the underlying data link and physical layer protocols used by data link and physical layer modules of the first computing system to communicate with the second computing system; and
- converting the instruction that is received from the supplicant at the abstraction module and into a form that is interpretable by the data link and physical layer modules of the first computing system.

14. A computer program product in accordance with claim 13, wherein the computer-executable instructions, when executed by the one or more processors at the first computing system, further cause the following:
- an act of the data link and physical layer modules that implement the data link and physical layer protocols receiving the converted instruction, comprising at least a derivative of the supplicant instruction; and
- an act of the data link and physical layer modules utilizing the data link and physical layer protocols to authenticate with the authenticator at the second computing system.

15. A computer program product in accordance with claim 13, wherein the one or more computer-readable media are physical media.

16. In a network environment including a first computing system that executes a supplicant and a second computing system that executes an authenticator, a method for the authenticator communicating with the supplicant to accomplish authentication of the first computing system or its user in a manner that is independent of the underlying data link and physical layer protocols used to communicate between the first and second computing systems, the method comprising:
- an act of the second computing system facilitating establishment of a data link layer connection with the first computing system using data link and physical layer protocols;
- an act of the authenticator receiving an indication that the data link layer connection has been established;
- an act of the authenticator determining that authentication is to occur with the supplicant;
- an act of the authenticator providing an instruction that authentication is to occur with the supplicant, the instruction being provided to an abstraction module and in a manner that is independent of the underlying data link and physical layer protocols used by the first computing system to communicate with the second computing system; and
- converting the instruction that is received from the supplicant at the abstraction module and into a form that is interpretable by the data link and physical layer modules of at least one of the first and second computing systems.

17. A method in accordance with claim 16, further comprising the following:
- an act of the data link and physical layer modules that implement the data link and physical layer protocols receiving the converted instruction, comprising at least a derivative of the authenticator instruction; and
- an act of the data link and physical layer modules utilizing the data link and physical layer protocols to authenticate the first computing system at the second computing system.

18. A method in accordance with claim 17, wherein the act of the data link and physical layer modules utilizing the data link and physical layer protocols to authenticate the first computing system comprises the following:
- an act of the data link and physical layer modules authenticating the first computing system using a validation service maintained by the second computing system.

19. A method in accordance with claim 17, wherein the act of the data link and physical layer modules utilizing the data link and physical layer protocols to authenticate the first computing system comprises the following:
- an act of the data link and physical layer modules authenticating the first computing system using a validation service maintained by a third computing system that is accessible over a network to the second computing system.

20. A method in accordance with claim 16, wherein the data link and physical layer protocols are wireless data link and physical layer protocols.

21. A method in accordance with claim 20, wherein the wireless data link and physical layer protocols are based on an IEEE 802.11 protocol.

22. A method in accordance with claim 20, wherein the wireless data link and physical layer protocols are based on an IEEE 802.15 protocol.

23. A method in accordance with claim 20, wherein the wireless data link and physical layer protocols are based on a GPRS protocol.

24. A method in accordance with claim 16, wherein the data link and physical layer protocols are based on an 802.3 compliant protocol.

25. A method in accordance with claim 16, wherein the authenticator is an 802.1x authenticator.

26. A computer program product for use in a network environment including a first computing system that executes a supplicant, and a second computing system, the computer program product comprising one or more computer-readable storage media having thereon computer-executable instructions that, when executed by one or more processors at the second computer system, cause the second computing system to implement an authenticator that communicates with the supplicant to accomplish authentication of the first computing system or its user in a manner that is independent of the underlying data link and physical layer protocols used to communicate between the first and second computing systems, and cause the following:

an act of the second computing system facilitating establishment of a data link layer connection with the first computing system using data link and physical layer protocols;

an act of the authenticator receiving an indication that the data link layer connection has been established;

an act of the authenticator determining that authentication is to occur with the supplicant;

an act of the authenticator providing an instruction that authentication is to occur with the supplicant, the instruction being provided to an abstraction module and in a manner that is independent of the underlying data link and physical layer protocols used by the first computing system to communicate with the second computing system; and converting the instruction that is received from the supplicant at the abstraction module and into a form that is interpretable by the data link and physical layer modules of at least one of the first and second computing systems.

27. A computer program product in accordance with claim 26, wherein the computer-executable instructions, when executed by the one or more processors at the second computing system, further cause the following:

an act of the data link and physical layer modules that implement the data link and physical layer protocols receiving the converted instruction, comprising at least a derivative of the authenticator instruction; and an act of the data link and physical layer modules utilizing the data link and physical layer protocols to authenticate the first computing system at the second computing system.

28. A computer program product in accordance with claim 26, wherein the one or more computer-readable media are physical media.

* * * * *